Nov. 6, 1945.    R. A. BECKWITH    2,388,305
SHIPPER MECHANISM FOR EXCAVATING SHOVELS
Filed Nov. 15, 1944    6 Sheets-Sheet 1

Inventor
R. A. Beckwith
By Robb and Robb
Attorneys

Nov. 6, 1945. R. A. BECKWITH 2,388,305
SHIPPER MECHANISM FOR EXCAVATING SHOVELS
Filed Nov. 15, 1944 6 Sheets-Sheet 2

Inventor
R. A. Beckwith
By Robert Cobb
Attorneys

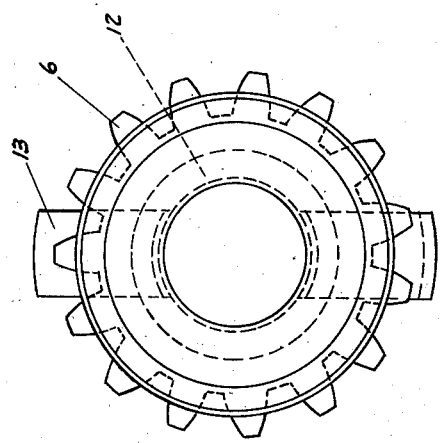
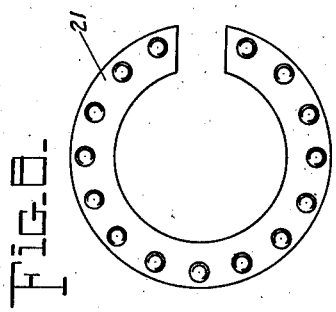
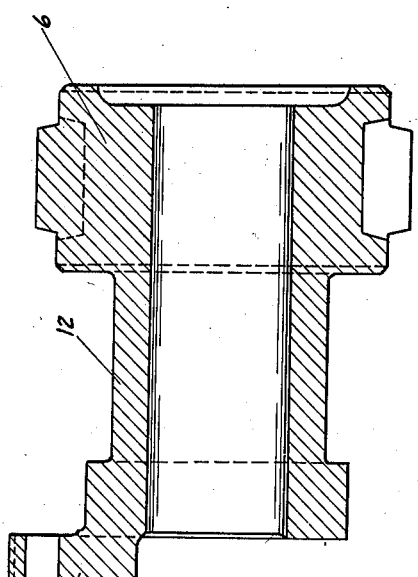
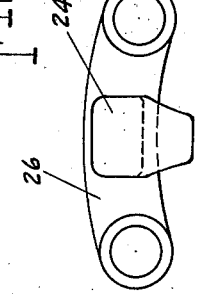
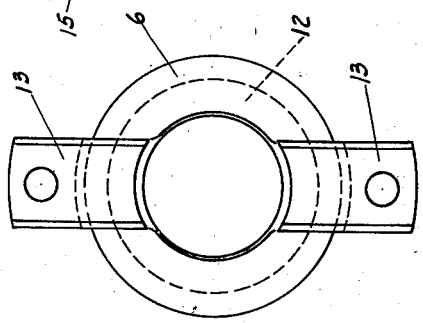

Nov. 6, 1945.  R. A. BECKWITH  2,388,305
SHIPPER MECHANISM FOR EXCAVATING SHOVELS
Filed Nov. 15, 1944    6 Sheets-Sheet 5

Nov. 6, 1945. R. A. BECKWITH 2,388,305
SHIPPER MECHANISM FOR EXCAVATING SHOVELS
Filed Nov. 15, 1944 6 Sheets-Sheet 6

Inventor
R. A. Beckwith
By Robert Cobb
Attorneys

Patented Nov. 6, 1945

2,388,305

UNITED STATES PATENT OFFICE 2,388,305

SHIPPER MECHANISM FOR EXCAVATING SHOVELS

Raymond A. Beckwith, Milwaukee, Wis., assignor to Koehring Company, Milwaukee, Wis., a corporation of Wisconsin Application November 15, 1944, Serial No. 563,546

7 Claims. (Cl. 214—145)

This invention involves improvements in certain operating mechanism of excavating machines of the shovel excavating type. The construction of shovel to which my present improvements primarily relate involves the employment of the usual boom equipped with dipper sticks carrying the dipper proper, which dipper sticks are racked out and in for the thrusting of the dipper into the earth for excavating and withdrawal of the dipper for unloading, respectively. A common type of shovel excavator of the above construction involves the use of a shipper shaft on the boom, which shipper shaft is driven by a sprocket chain connection with a sprocket on and adapted to drive the shipper shaft. Obviously, the driving sprocket must be coupled rigidly to the shipper shaft pinions which engage the racks of the dipper stick or sticks, and owing to the heavy and sudden driving loads transmitted to the driven sprocket connected to the shipper shaft, connections between the sprocket and said shaft heretofore proposed break down from time to time because they prove inadequate to stand up under operating conditions, such connections often comprising keys, tapers with keys, bolted flanges, or the like. Obviously, the foregoing requires considerable repairs in the field, and in the past this feature of the sprocket drive shipper shaft pinions or shipper shaft unit has been a weakness of the machine, aside from the maintenance cost of replacement of worn or broken parts at this point of the machine construction.

One phase of my present improved invention lies, therefore, in the provision of novel means for connecting the driven sprocket at the shipper shaft with the shipper shaft pinions that engage the racks of the dipper stick or sticks, whereby the connecting means between the said parts is of a rigid nature and does away with the disadvantageous break-downs that have heretofore been experienced due to the heavy driving torque transmitted to the shipper shaft pinions from the operating mechanism for the sprocket chain that carries the drive from the operating mechanism in the cab of the shovel to the dipper stick. A second primary improvement of my present invention relating also to the shipper mechanism referred to comprises novel provisions for the mounting of the shipper shaft in the boom structure such that said shaft may be moved bodily relatively to the boom whereby to carry with it the driven sprocket operated by the sprocket chain drive, and in this manner enable the adjustment of the shipper shaft as the axis of the driven sprocket to take up slack in the driving sprocket chain that engages the driven sprocket. This latter provision of novel mounting means for the shipper shaft involves eccentric supporting members on the boom in which the shipper shaft is mounted, and a further important improvement of this invention resides in provisions whereby the eccentric mounting means aforesaid can be mechanically operated under the power of the movement of the shipper pinions as driven by the driven sprocket connected therewith, for effecting the variation in the axial position of the shipper shaft upon the boom for the purpose described.

My invention, in its preferred adaptations is described in detail in the following specification and is illustrated in the accompanying drawings, in which:

Figure 6 is an end view of the shipper pinion and sleeve, looking from one end thereof.

Figure 7 is a sectional view of the shipper sleeve and pinion unit.

Figure 8 is an opposite end view of the shipper sleeve and pinion unit.

Figure 12 is a side vew of one of the pinion engaging members for connecting an eccentric supporting member for the shipper shaft with its adjacent shipper pinion, when adjusting said shipper shaft.

Figure 13 is an end view of the member shown in Figure 12.

Figure 14 is a side view of one of the horse shoe rings that cooperates with an associated eccentric supporting member.

Figure 16:
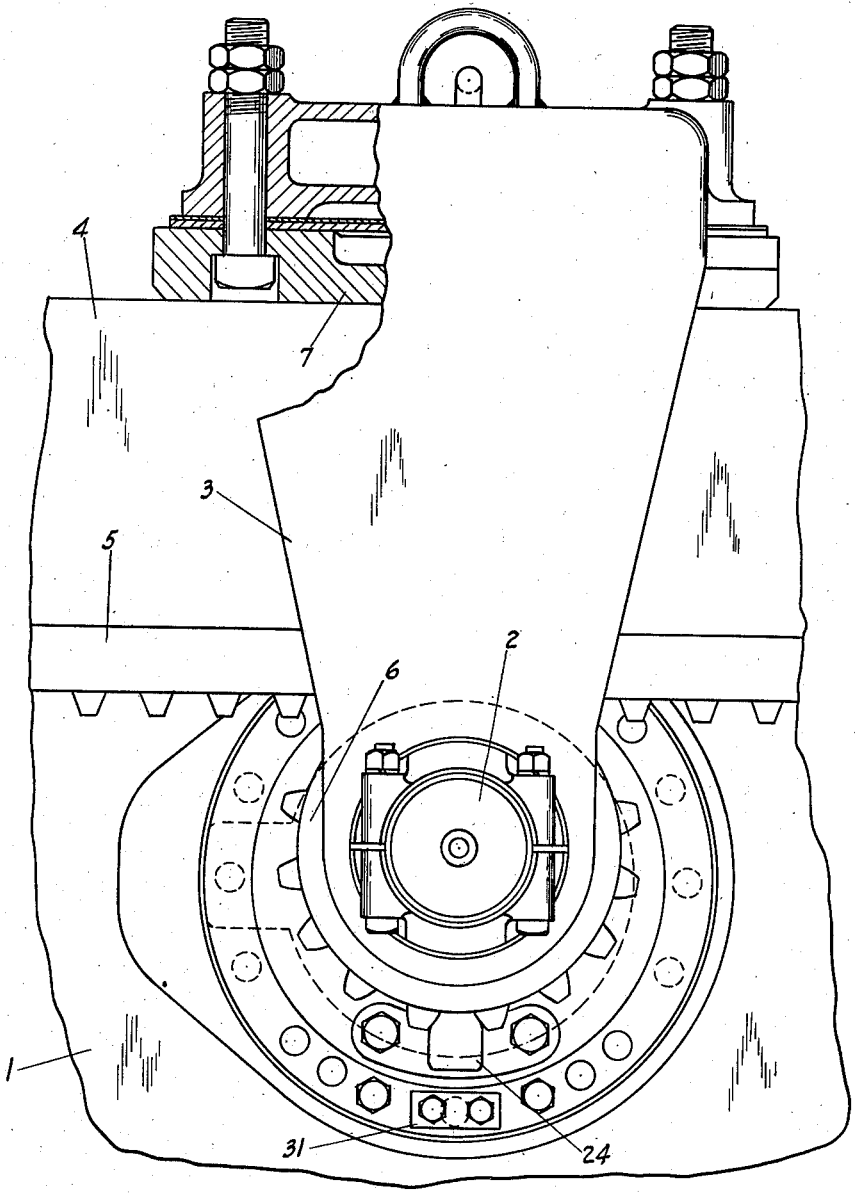
Figure 16 is a view showing more clearly the saddle mounting and shipper mechanism units of the shovel dipper.

Describing the features of my improvements in detail, I refer first generally to Figure 16 of the drawings wherein there is illustrated partially the boom 1 in which the shipper shaft 2 is mounted, as will be more fully explained hereinafter, the said shaft 2 supporting the saddle blocks 3 which guide and support the dipper sticks 4 in their sliding and swinging movement after known method of use and general construction. The dipper sticks 4 are equipped with the toothed racks 5 which engage the shipper pinions 6 disposed on the shipper shaft 2 as an axis. The usual shoes 7 maintain the dipper sticks 4 in their racking engagement with the shipper pinions 6.

Figure 1:
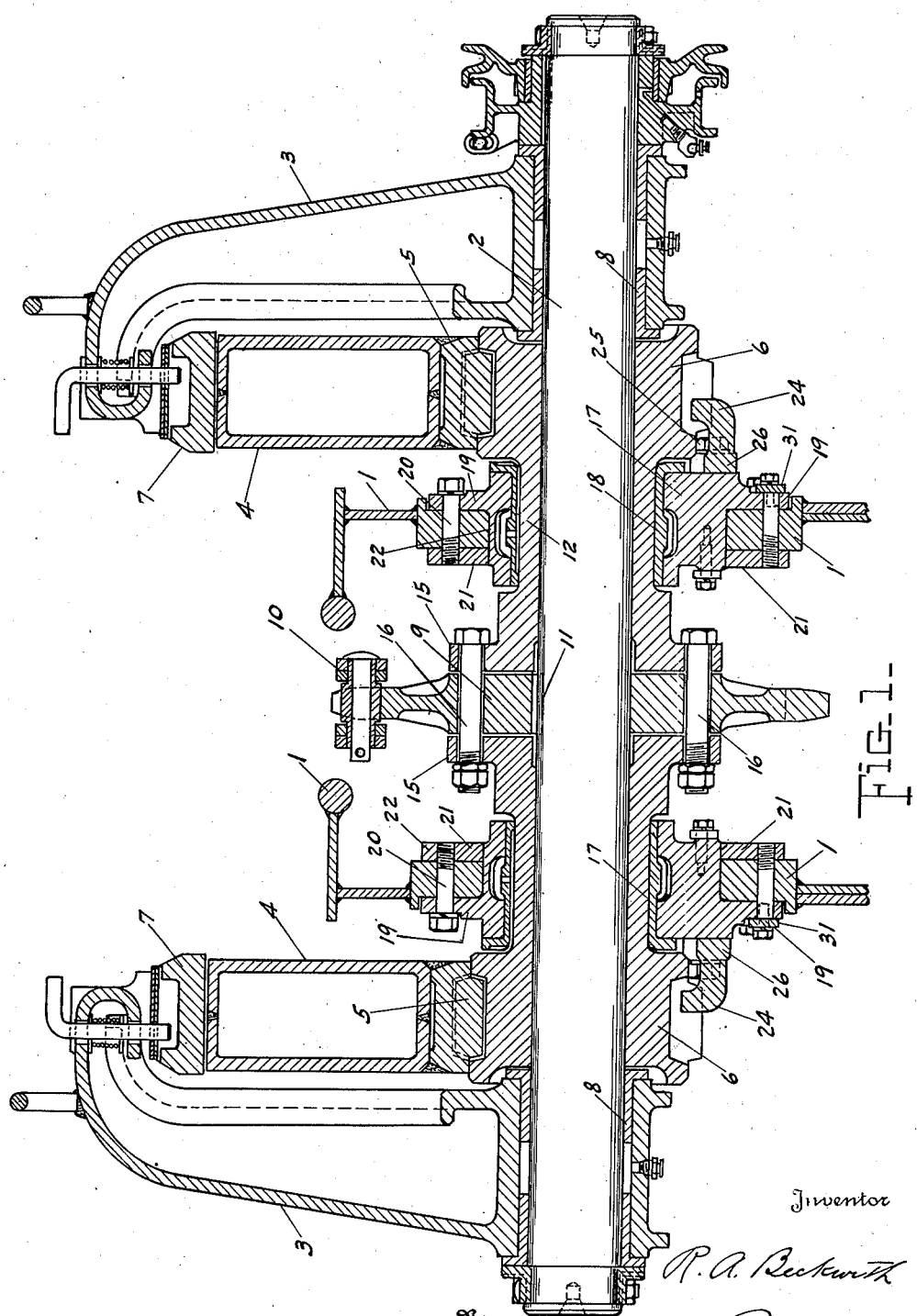
Figure 1 is a sectional view transversely of the boom of my shovel excavator, illustrating the relation of the dipper sticks, supporting saddles therefor, shipper shaft, driven sprocket on said shaft, and the connections between the driven sprocket and the shipper pinions, including associated parts.

Directly describing the shipper mechanism of my invention, reference is made particularly to Figure 1 wherein the boom 1 is seen in cross section and the other parts previously referred to are designated and visible. The shipper shaft 2 is provided with bearings 8 for the saddle blocks 3 and said shaft 2 carries at the middle portion thereof the driven sprocket 9 which is connected by a sprocket chain 10, only partially shown, with driving sprocket means at the base of the boom, the latter not shown and in turn driven from the driving mechanism which is mounted in the cab or body of the shovel crane. The last mentioned mechanism is well known in the art and is not illustrated since it does not form any part of my invention.

The driven sprocket 9 is keyed at 11 to the shaft 2 but this means does not in any way carry the driving torque of the sprocket gear 9 to the shipper pinions 6. Practically speaking, it is merely a positioning key connection between the parts 9 and 2.

Figure 2:
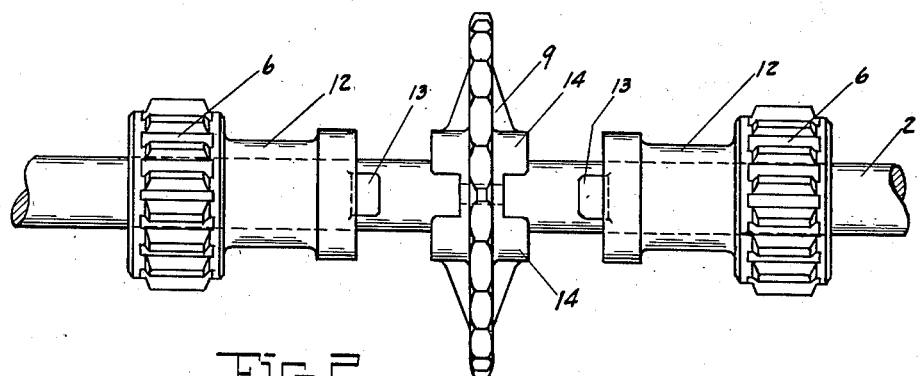
Figure 2 is a top plan view illustrating the shipper shaft, shipper pinions, and driven sprocket, preliminary to the movement of the pinions into interlocked relation to the sprocket; the double jaws of the sprocket being illustrated clearly in association with, but separated from, the single jaws of the shipper pinion sleeves.
Figure 3:
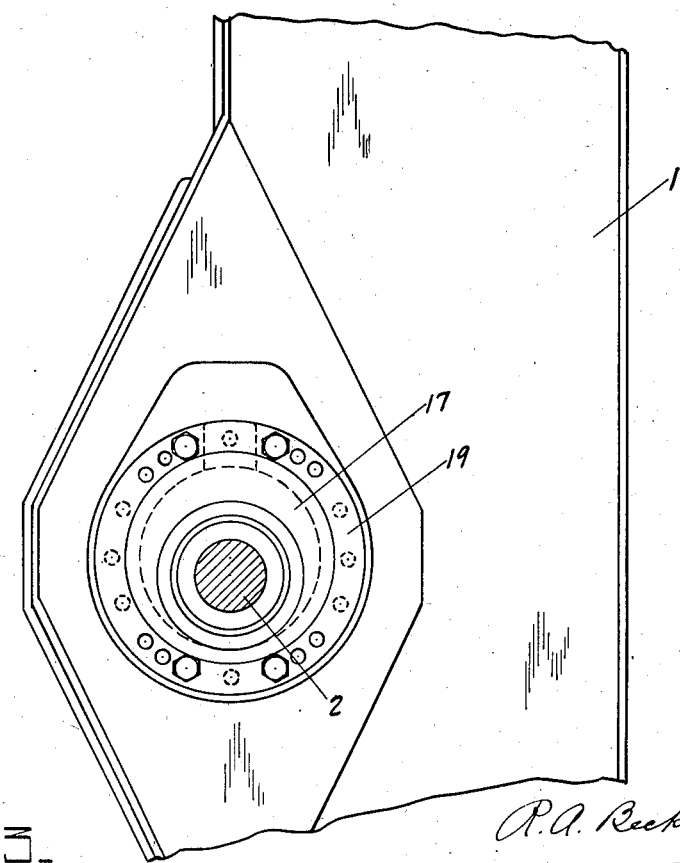
Figure 3 is a fragmentary side view of the boom structure illustrating the shipper shaft in section and showing more clearly the eccentric supporting pinions for said shaft, and means to hold the latter in adjusted positions.
Figure 4:
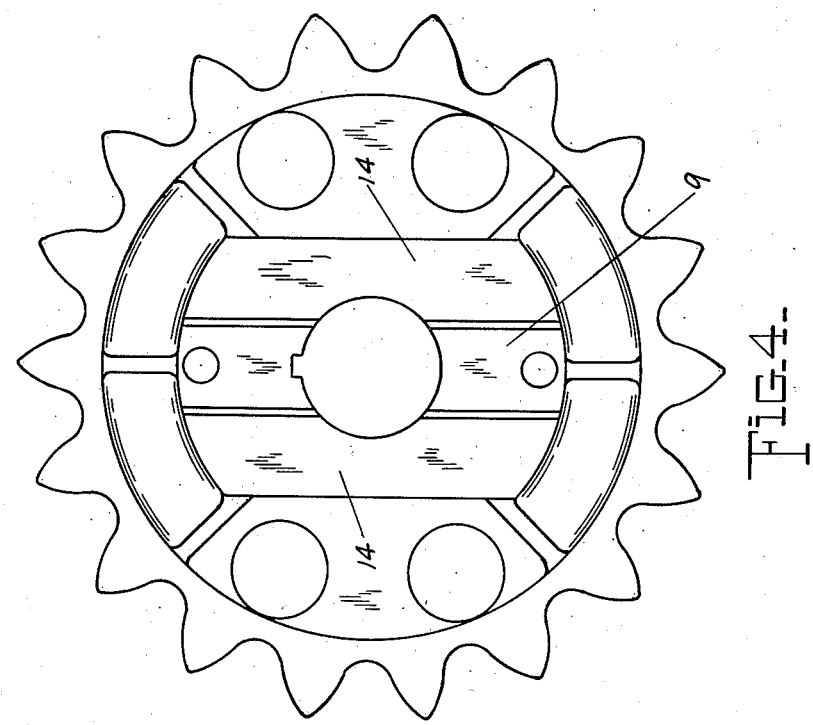
Figure 4 is an enlarged side view of the driven sprocket for the shipper shaft, alone.
Figure 5:
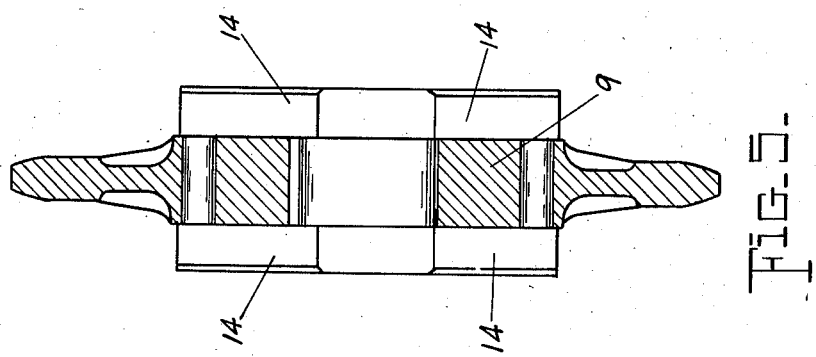
Figure 5 is a vertical sectional view of the sprocket as illustrated in Figure 4.

Each shipper pinion 6 is formed with an integral sleeve member 12 extending from one side of the pinion, and this sleeve is provided at its inner end, as seen best in Figures 2 and 6, with single jaw members 13 which are of considerable lengh and adapted to interlockingly engage with spaced jaw members 14 carried by an adjacent side of the driven sprocket 9. Of course the sprocket 9 is the rotating driven element which carries the driving torque to the dipper sticks 4 through the pinions 6 and the racks 5, and it will be apparent that when the shipper parts just described are assembled on the shaft 2 as shown in Figure 2, they may be forced together so that the jaws 13 interlock with the jaws 14, and thereupon the flange portions 15 of the sleeves 12 with which the jaws 13 are integrally formed will be attached to the sprocket 9 by means of the bolts 16 disposed at intervals around the circular area of the flanges 15. In this manner the bolts 16 clamp the jaws 13 and 14 in positive interlocking relation so that the driving torque of the sprocket gear 9 will be transmitted by means of the said jaws to the sleeve 12 and therefore to the shipper pinions 6. The above provision affords a rigid and strong interlocking connection between the parts 9 and 6, a connection which cannot easily become broken, and one on which there is practically no wear because the jaws 13 fit snugly and tightly between the jaws 14, and, therefore, breakage, damage, looseness, or undue play between the members 9 and 12 is not possible with the resultant disadvantages that would be incident thereto.

Figure 11:
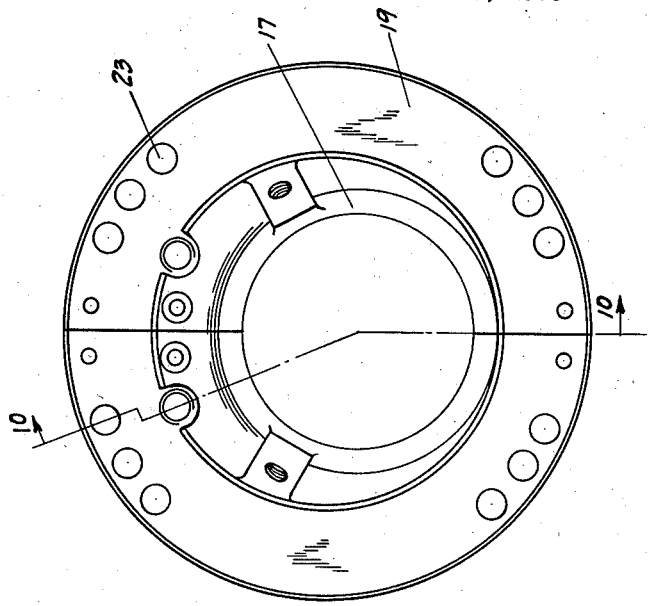
Figure 11 is a side view of the unit of Figure 9, looking in a direction opposite from that of said Figure 9.
Figure 10:
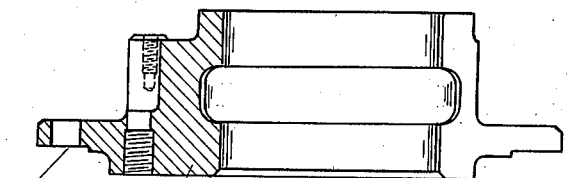
Figure 10 is a view of one-half section of the unit of Figure 9.
Figure 9:
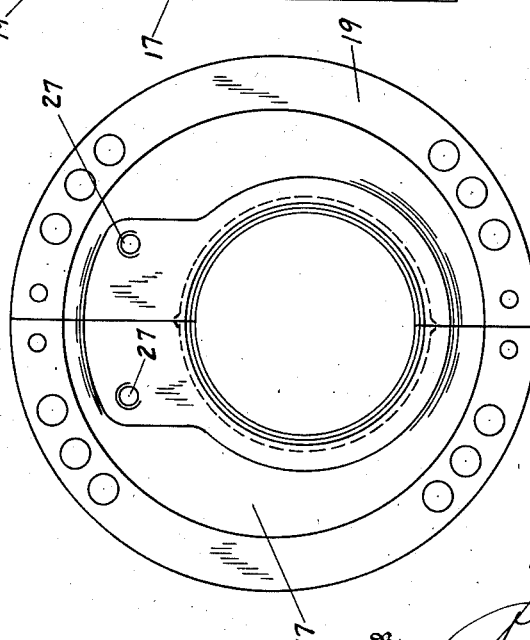
Figure 9 is a side view of one of the eccentric supporting member units.

The pinions 6 with their sleeves 12 rotate relatively to the boom, and for mounting these parts along with the shaft 2 passing therethrough upon the boom I provide eccentric supporting members 17, the eccentric circular peripheries of which are seated in suitable openings in the side members of the boom 1. The eccentric supporting members 7 are formed with eccentric openings that receive the narrow diameter portions centrally located on the sleeves 12. Suitable bearings 18 are interposed between the circular openings of the eccentric members 17 and the sleeves 12. The eccentric members 17 are shown in Figures 9, 10, and 11, and in order to emplace the same around the sleeves 12 each of these members is made in two half sections brought together to encircle the sleeve 12 cooperating therewith. Each of the eccentric members 17 comprises a flange 19, and screw bolts 20 are employed to bolt said flanges through openings in the adjacent section of the boom 1, said screw bolts 20 screwing into horse shoe rings 21, seen best in Figure 14, by which connecting means the eccentric members 17 are firmly attached to the boom. It is notable, however, that the boom sides are provided with a series of circularly arranged openings through which the bolts 20 pass in effecting their attachment of the eccentric members 17 to the boom, and it is contemplated that the eccentric members may be turned slightly in the openings of the boom in which they are mounted, said openings designated 22, in order that by shifting the eccentric members, relatively small movement may be imparted to the shaft 2 to move the latter toward or from the base of the boom, and thereby correspondingly move the driven sprocket gear 9. This shifting of the eccentrics 17 rotatively will be accomplished in the proper setting of the shipper shaft 2 in the assembly of the machine, but the primary object of this eccentric mounting for the sleeves 12 and the shaft 2 is to enable the shaft 2 to be moved short distances from the foot of the boom in order to take up slack in the sprocket chain 10 that connects the driven sprocket gear 9 to the driving sprocket gear, not shown, but which is located usually at the foot of the boom. Once the eccentric members 17 are turned to the desired adjustment for the shaft 2 and the parts 6 and 12 and 9 on said shaft, the said eccentrics will be locked or held in their proper adjusted positions by means of the bolts 20 passed through the openings 23.

The turning of the eccentrics 17 for adjustment purposes would be a difficult matter in view of the assembly of the parts of my shipper mechanism without some special provision in this connection. I therefore provide means whereby I may utilize the driving force or torque that is communicated to the shipper pinions 6 for effecting rotation of the eccentrics 7 in obtaining desired adjustments of the latter for shifting of the axis position of the parts 2 and 12 and 9, which are practically a unit. With this in mind, I employ an engaging dog 24 such as illustrated in Figures 1, 12, 13, and 16, and which is adapted to be removably applied, one to each eccentric 17, after the manner shown in Figure 16, as by means of bolts 25. Each dog 24 is carried by a curved plate 26 having end openings through which bolts may be passed to bolt each dog to its associated eccentric at the openings 27 of the latter, see Figure 9. When so bolted to the associated eccentric 17, the dog 24 will be engaged between two teeth of the adjacent shipper pinion 6, see Figure 1. In this manner the shipper pinion is interlocked with its associated eccentric member 17. Under these conditions, when power is applied to the sprocket 9 to turn the two pinions engaged by the dog 24, it will be apparent that the eccentric members 17 may be turned whatever distance is required for the adjustment of the shaft 2 to shift the latter for the tightening of the sprocket chain 10, as previously noted. Once the adjustment is arrived at, the bolts 20, having been previously removed to permit the turning of the eccentric members 17 when the eccentrics are located partly, may be replaced to lock the eccentrics in position and tightly clamp them to the boom sections of the boom 1 in which they are mounted.

Under the above conditions it is obvious that the power of the driving torque provided by the sprocket 9 may be availed of to shift the position of the shipper shaft 2 and parts supported thereon including said sprocket 9, and therefore no hand operation for turning the eccentrics 17 is required, an operation which would be difficult in view of the type of construction which is provided.

Figure 15:
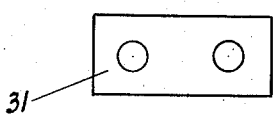
Figure 15 is a detail view of one of the connecting plates for the sections of the eccentric supporting members.

In Figure 15 is shown a form of connecting plate 31 such as used for connecting together the halves of the eccentric supporting members 17 for holding same assembled about the pinion sleeves 12.

Having thus described my invention, what I claim as new and desire to secure by Letters Patent of the United States, is:

1. Shipper mechanism for power shovels, comprising a boom, a shipper shaft, mounted on the boom, a driving gear supported by said shaft, shipper pinions mounted on said shaft, dipper sticks having racks engaged by said shipper pinions, and connecting means between the shipper pinions and said driving gear comprising sleeves extending from the pinions to the driving gear at opposite sides of the latter, ends of said sleeves adjacent the driving gear and said driving gear having interlocking jaws for transmitting the driving torque of the gear to the pinions, and fastening means common to the said sleeves for fastening them together and to the gear.

2. Shipper mechanism for racking in and crowding out the dipper sticks of an excavating shovel, comprising a boom, a shipper shaft, sleeves in which said shaft is mounted supported on the boom, a driven gear on said shaft and arranged between said sleeves and connected to adjacent ends of the latter, eccentric members arranged on the boom and supporting the sleeves whereby on turning said eccentric members the sleeves, driven gear, and shipper shaft may be shifted bodily relatively to the boom, and shipper pinions operated by said sleeves, and means operable from the sleeves to turn the eccentric members.

3. Shipper mechanism as claimed in claim 2, in which the sleeves are formed at their ends adjacent to the driven gear with jaws and in which the driven gear is provided with jaws interlocking with the jaws of the sleeves.

4. Shipper mechanism as claimed in claim 2, combined with members constituting the last means recited for connecting the eccentrics with shipper pinions, whereby driving torque transmitted to the shipper pinions may be used to turn the eccentrics.

5. Shipper mechanism as claimed in claim 2, combined with members constituting the last means recited for connecting the eccentrics with shipper pinions, whereby driving torque transmitted to the shipper pinions may be used to turn the eccentrics, and comprising dogs attachable to the eccentrics and engageable between teeth of the shipper pinions.

6. Shipper mechanism for racking in and crowding out dipper sticks of a power shovel, including a shipper shaft, shipper pinions on said shaft, a boom, mounting means between said shaft and said boom for effecting bodily adjustment of the shaft, a driven gear carried by the shaft, and means for drivably connecting the shipper pinions to said mounting means for the shipper shaft to thereby move the latter and shift the shipper shaft, shipper pinions, and driven gear bodily relatively to the boom.

7. Shipper mechanism for racking in and crowding out dipper sticks of a power shovel, including a shipper shaft, shipper pinions on said shaft, a boom, mounting means between said shaft and said boom for effecting bodily adjustment of the shaft, a driven gear carried by the shaft, and means for drivably connecting the shipper pinions to said mounting means for the shipper shaft to thereby move the latter and shift the shipper shaft, shipper pinions, and driven gear bodily relatively to the boom, and including members attachable to the mounting means for the shipper shaft and interengageable with the teeth of the shipper pinions.

RAYMOND A. BECKWITH.